United States Patent [19]
DeLano

[11] Patent Number: 5,617,549
[45] Date of Patent: Apr. 1, 1997

[54] SYSTEM AND METHOD FOR SELECTING AND BUFFERING EVEN AND ODD INSTRUCTIONS FOR SIMULTANEOUS EXECUTION IN A COMPUTER

[75] Inventor: Eric R. DeLano, Fort Collins, Colo.

[73] Assignee: Hewlett-Packard Co, Palo Alto, Calif.

[21] Appl. No.: 296,989

[22] Filed: Aug. 26, 1994

Related U.S. Application Data

[63] Continuation of Ser. No. 957,344, Oct. 6, 1992, abandoned.

[51] Int. Cl.⁶ ............................................. G06F 9/38
[52] U.S. Cl. ...................... 395/382; 395/800; 395/391
[58] Field of Search .................................. 395/375, 800, 395/250

[56] References Cited

U.S. PATENT DOCUMENTS

| | | | |
|---|---|---|---|
| 4,766,566 | 8/1988 | Chuang | 395/375 |
| 5,051,885 | 9/1991 | Yates, Jr. et al. | 395/375 |
| 5,072,364 | 12/1991 | Jardine et al. | 395/375 |
| 5,163,139 | 11/1992 | Hayh et al. | 395/375 |
| 5,241,636 | 8/1993 | Kohn | 395/375 |
| 5,404,472 | 4/1995 | Kurosawa et al. | 395/375 |

OTHER PUBLICATIONS

*Superscalar Microprocessor Design*, Mike Johnson, Chapter 3, Developing an Execution Model, pp. 31–55, 1991 by Prentice Hall, Inc.

*A High Speed Superscalar PA–RISC Processor*, Eric DeLano, Will Walker, Jeff Yetter, Mark Forsyth, pp. 116–121, IEEE Computer Society, 10662 Los Vaqueros Circle, P.O. Box 3014, Los Alamitos, CA 90720–1264.

Primary Examiner—Ken S. Kim

[57] ABSTRACT

The present invention is directed to a system and method for selecting instruction words from a memory system for simultaneous execution in an execution unit of a computer system. In one example, an instructor selector unit of the present invention employs an addressing unit to fetch instructions from an instruction cache. The instructor selector unit also employs a receiver unit for buffering and transferring multiple aligned as well as misaligned instructions. The instruction selector unit supplies these instructions to an instruction execution unit (having an integer unit and a floating point unit), which is capable of executing two bundled instructions simultaneously. The instruction selector unit can provide instructions to the instruction execution unit individually, or as a bundled pair.

19 Claims, 7 Drawing Sheets

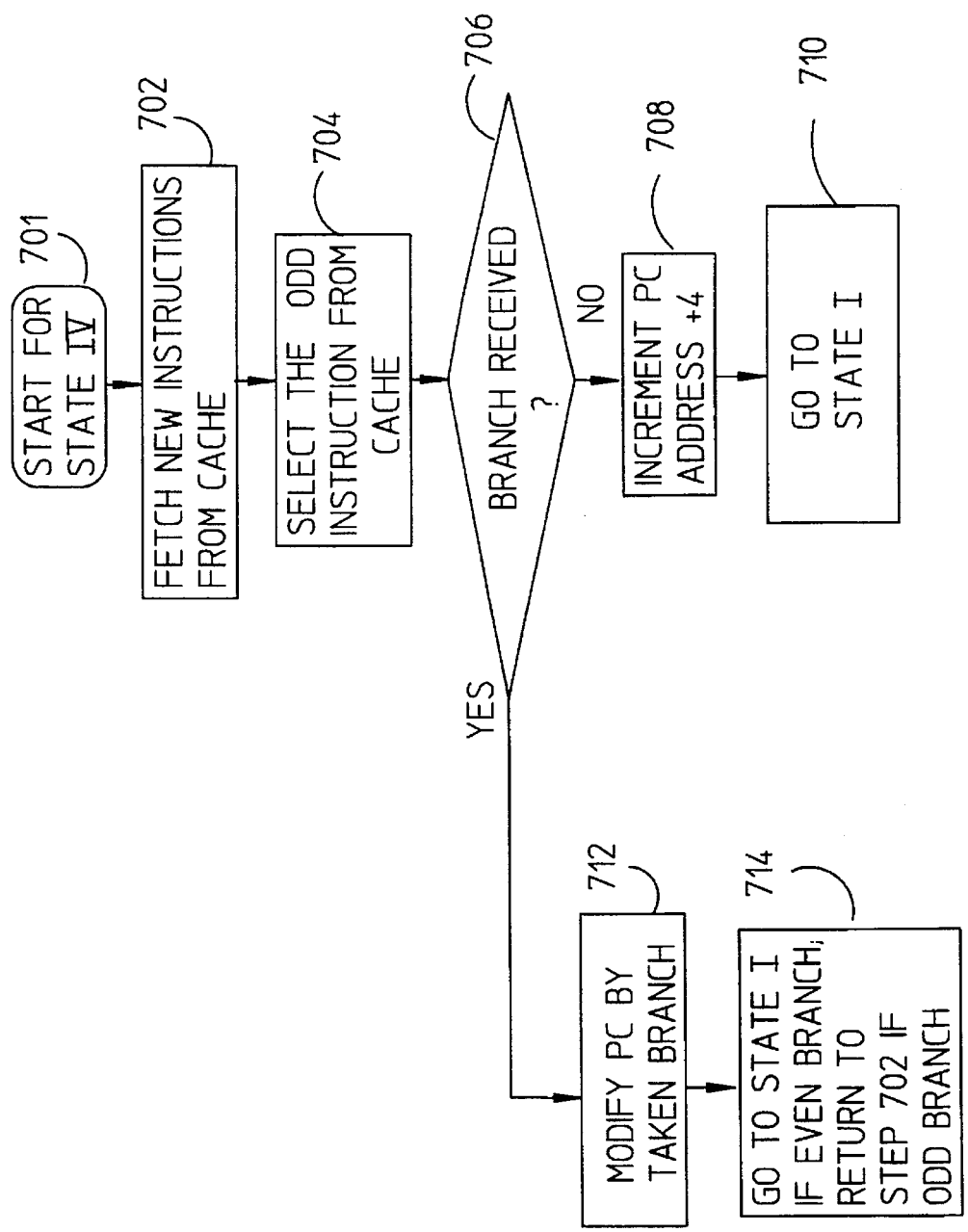

SYSTEM AND METHOD FOR SELECTING AND BUFFERING EVEN AND ODD INSTRUCTIONS FOR SIMULTANEOUS EXECUTION IN A COMPUTER

This is a continuation of application Ser. No. 07/957,344, filed on Oct. 6, 1992, now abandoned.

BACKGROUND OF THE INVENTION

1. Field of the Invention

The present invention relates generally to a system and method for fetching instructions from a memory system for execution in a computer. More particularly, the present invention relates to a system and method for selecting and buffering pairs of instructions from cache for simultaneous execution by a central processing unit.

2. Related Art

Processors used in conventional computer systems typically execute program instructions one at a time, in sequential order. The process of executing a single instruction involves several sequential steps. The first step generally involves fetching the instruction from a memory device. The second step generally involves decoding the instruction, and assembling any operands. The third step generally involves executing the instruction, and storing the results. Some processors are designed to perform each step in a single cycle of the processor clock. Alternatively, the processor may be designed so that the number of processor clock cycles per step depends on the particular instruction.

Modem computer systems commonly use an instruction cache to temporarily store blocks of instructions before execution. Instructions are then fetched from the instruction cache by the processor. The fetching process is normally controlled by a program counter. The contents of the program counter typically indicate the starting address in cache or memory from which the next instruction or instructions are to be fetched. Depending on the design of the processor, each instruction may have a fixed length, or a variable length. For example, a processor might be designed such that all instructions have a fixed length of 32 bits (4 bytes, or a "longword"). Fixed length instruction formats tend to simplify the instruction decode process.

Computer systems are commonly designed such that the processor can only fetch instructions from memory or cache in blocks which fall on certain memory boundaries. For example, a computer system might be designed such that all instruction fetches consist of 32-bit reads from longword-aligned locations in memory. Memory for such a system can be thought of as being divided into fixed, 32 bit blocks, which can only be accessed by the processor one at a time. Thus, the location within memory where an instruction resides can affect the time required to fetch the instruction. In the example system above, if a 32 bit instruction does not fall on a longword boundary (and is thus "misaligned"), the processor must fetch two longwords in order to obtain the instruction.

Modem computers commonly use a technique known as pipelining to improve performance. Pipelining involves the overlapping of the sequential steps of the execution process. For example, while the processor is performing the execution step for one instruction, it might simultaneously perform the decode step for a second instruction, and perform a fetch of a third instruction. Pipelining can thus decrease the execution time for a sequence of instructions. Superpipelined processors attempt to further improve performance by overlapping the sub-steps of the three sequential steps discussed above.

Another technique for improving performance involves executing two or more instructions in parallel, simultaneously. Processors which utilize this technique are generally referred to as superscalar processors. The ability of a superscalar processor to execute two or more instructions simultaneously depends upon the particular instructions being executed. For example, two instructions which both require use of the same, limited processor resource (such as the floating point unit) cannot be executed simultaneously. This type of conflict is known as a resource conflict. Such instructions cannot be combined or "bundled" with each other for simultaneous execution, but must be executed alone, or bundled with other instructions. Additionally, an instruction which depends on the result produced by execution of a previous instruction cannot be bundled with that previous instruction. The instruction which depends on the result of the previous instruction is said to have a data dependency on the first instruction. Similarly, an instruction may have a procedural dependency on a previous instruction, which prevents the two instructions from being bundled. For example, an instruction which follows a branch instruction cannot be bundled with the branch instruction, since its execution depends on whether the branch is taken.

The superscalar processor must therefore be able to determine whether two or more given instructions can be bundled. Since this determination cannot be made without first decoding the instructions, the determination is commonly made by the instruction decode unit of the processor.

Computer systems that are capable of simultaneous execution of a bundle of instructions are especially vulnerable to instruction misalignment. Even if two instructions can otherwise be bundled for simultaneous execution, if the two instructions do not fall on the necessary boundary within cache or memory, the two instructions cannot be fetched simultaneously, and cannot be executed simultaneously. Thus, misalignment of bundles of instructions can prevent the performance benefits of a superscalar processor from being achieved.

Some superscalar systems are designed to allow execution of aligned as well as misaligned instruction bundles. Typically, these conventional systems incur penalty cycles when switching from aligned bundles to misaligned bundles and visa versa. Additionally, these computer systems suffer penalty cycles on transitions from the execution of a single instruction to the execution of a bundle of instructions. This reduces the speed and overall performance of the processor.

Therefore, what is needed is a computer system and method that provides flexibility in switching between execution of single instructions and execution of bundles of instructions, and which incurs no penalty cycle when switching between single instructions and bundles of instructions, or between aligned bundles and misaligned bundles.

One other area that needs improvement in selecting pairs of instructions for simultaneous execution in a processor pertains to instruction buffering. Processors commonly use buffers to receive and temporarily store instructions fetched from cache for execution. Currently, computer system instruction pre-fetch buffers tend to be large and complicated, commonly requiting storage space for more than two 64-bit (doublelongword) instruction entries. Such large buffering designs are currently needed to alleviate the problems associated with executing bundles which fall across alignment boundaries.

Therefore, in order to solve this problem, what is needed is a computer pre-fetch buffering system that requires a minimum amount of space, less than or equal to the maximum instruction length.

SUMMARY OF INVENTION

The present invention is directed to a system and method for selecting instruction words from a memory system for optimal simultaneous execution in a superscalar processor. In a preferred embodiment, an instructor selector unit of the present invention, employs an addressing unit to fetch instructions from an instruction cache. The instructor selector unit also employs a receiver unit for buffering and transferring multiple aligned as well as misaligned instructions. The instruction selector unit then supplies these instructions, either individually or as a bundled pair, to an instruction execution unit (having an integer unit and a floating point unit), which is capable of executing two bundled instructions simultaneously.

The instructor selector unit is adapted to receive predecoded information from an instruction decode unit indicating whether two instructions can be bundled and whether an instruction is a floating-point instruction or an integer instruction. Multiplexers provide a means for directing instructions to the floating-point unit and the integer unit.

The receiver unit has an even buffered pathway for storing even addressed instructions and an odd buffered pathway for storing odd addressed instructions. The receiver unit also has non-buffered busses for transferring even and odd instructions to the execution unit for immediate execution or "fast path" execution.

Whether instructions are buffered or chosen for fastpath execution typically depends on which instructions can be bundled with one another for immediate simultaneous execution. Generally, if even and odd addressed instructions transmitted to the receiving unit from cache can be bundled, then they will follow the fast path bypassing the buffered pathway (master/slave registers) for immediate execution. On the other hand, if even and odd instructions cannot be bundled, one or both the instructions will be stored for use in a subsequent processor cycle. Instructions that are stored may be bundled with other instructions in subsequent processor cycles.

The present invention greatly increases flexibility (over conventional techniques) when switching between execution of single instructions and execution of bundled instructions. The present invention incurs no penalty cycle when switching between single instructions and bundled instructions, or between aligned bundles and misaligned bundles. The present invention accomplishes the aforementioned by employing an apparatus that requires a minimum amount of buffering, less than or equal to the maximum instruction length.

Further features and advantages of the present invention, as well as the structure and operation of various embodiments of the present invention, are described in detail below with reference to the accompanying drawings.

BRIEF DESCRIPTION OF THE DRAWINGS

FIG. 7 is a flow chart illustrating the operation of instruction selector unit while operating in state IV.

DETAILED DESCRIPTION OF THE INVENTION

1.0 Overview

The present invention is directed to a system and method for selecting and buffering pairs of instructions from an instruction cache for simultaneous execution in a superscalar processor. One embodiment of the present invention is described in two sections below: a system environment and operation of the instruction selector unit.

2.0 System Environment

Figure 1:
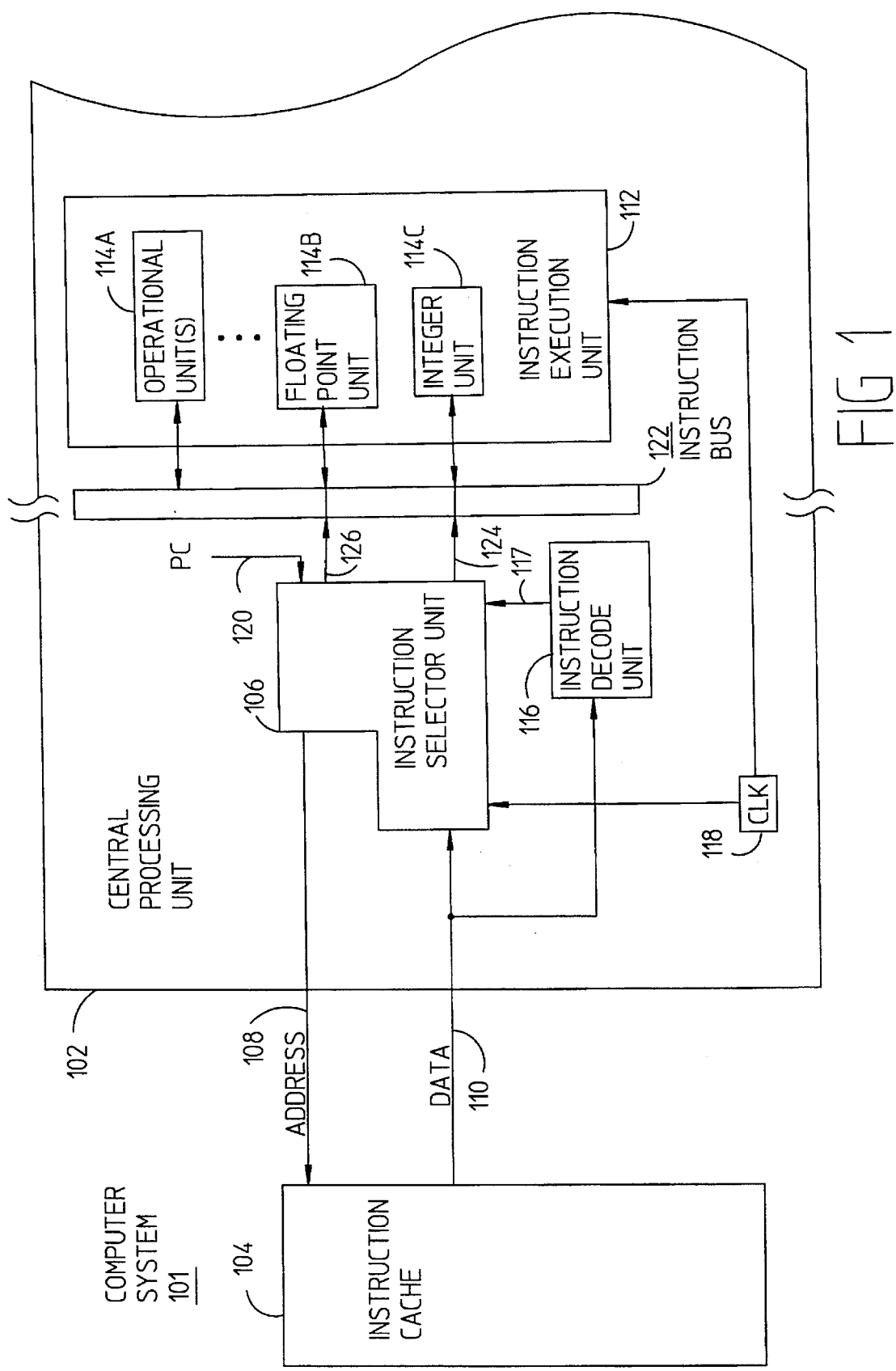
FIG. 1 illustrates a computer system which incorporates a preferred embodiment of the present invention.

FIG. 1 illustrates a computer system 101 which incorporates a preferred embodiment of the present invention. The computer system 101 includes a central processing unit (CPU) 102 and an instruction cache (cache) 104.

The CPU 102 of the preferred embodiment has a fixed instruction length of 32 bits, or 1 longword, and is capable of executing two instructions simultaneously. Other instruction lengths and bundle sizes are possible, as is apparent to those skilled in the art. Generally, the CPU 102 operates by fetching instructions from cache 104 in 64 bit (doublelongword) quantities. Thus, the CPU 102 is capable of fetching two instructions simultaneously. Fetching of instructions is controlled by a program counter (PC) 120 via an instruction selector unit 106 (to be described below). The instruction selection unit 106 provides an address to cache 104 via an address bus 108. The address on the address bus 108 specifies the location of the doublelongword to be read from cache 104.

Cache 104 transmits addressed instructions to the CPU 102 via a 64-bit data bus 110. An instruction decode unit 116 and the instruction selector unit 106 receive the instructions. The instruction selector unit 106 then supplies multiple aligned as well as misaligned instructions to an execution unit of a superscalar processor or an instruction execution unit 112, which is capable of executing 2 bundled instructions simultaneously. The instruction selector unit 106 can provide instructions to the instruction execution unit 112 individually, or as a bundled pair.

In the preferred embodiment instructions are supplied by the instruction selector unit 106 via busses 124, 126 and instruction bus 122, to two operational units: a floating-point unit 114B and integer-unit an 114C. As shown in FIG. 1, the instruction selector unit 106 could provide instructions for any type of operational unit(s) 114A.

In the preferred embodiment, CPU 102 is a precision architecture reduced-instruction-set computer (PA-RISC) superscalar processor, currently employed in Series 800 and 900 multi-user work stations of Hewlett-Packard Company, Palo Alto, Calif., U.S.A., see *A High Speed Superscalar PA-RISC Processor,* Delano, E., et al., IEEE Computer Society Press Reprint from Proceedings of the Compcon Spring 1992 digest of Papers, pp. 116–124 (1992) (incorporated herein by reference). It should be noted that many other CPU architectures can be utilized employing most CISC or RISC designs; for other such examples see *Super-* scalar *Microprocessor Design,* Johnson, M., Chapter 3, pp. 44–48, Prentice Hall, Englewood Cliffs, N.J. (1991) (incorporated herein by reference as if described below).

In the preferred embodiment the CPU 102 is integrated on a single chip. However, the CPU 102 can be implemented as multiple chips.

The instruction decode unit 116 decodes instructions and contains timing and control logic for generating the proper sequence of control signals (not shown) to complete execution of each instruction. The instruction decode unit 116 provides a bundle signal 117 to the instruction selector unit 106 that indicates whether a given pair of instructions can be bundled. Thus, the instruction decode unit determines whether a pair of instructions can be bundled for simultaneous execution.

In the preferred embodiment, cache 104 is direct mapped structure. However, cache 104 may be implemented as a set-associative structure or a fully-associative structure.

3.0 Structure and Operation of the Instruction Selector Unit

The remaining discussion pertains to the preferred embodiment of the instruction selector unit 106. The elements shown in FIG. 1 are referred to throughout the discussion.

Figure 2:
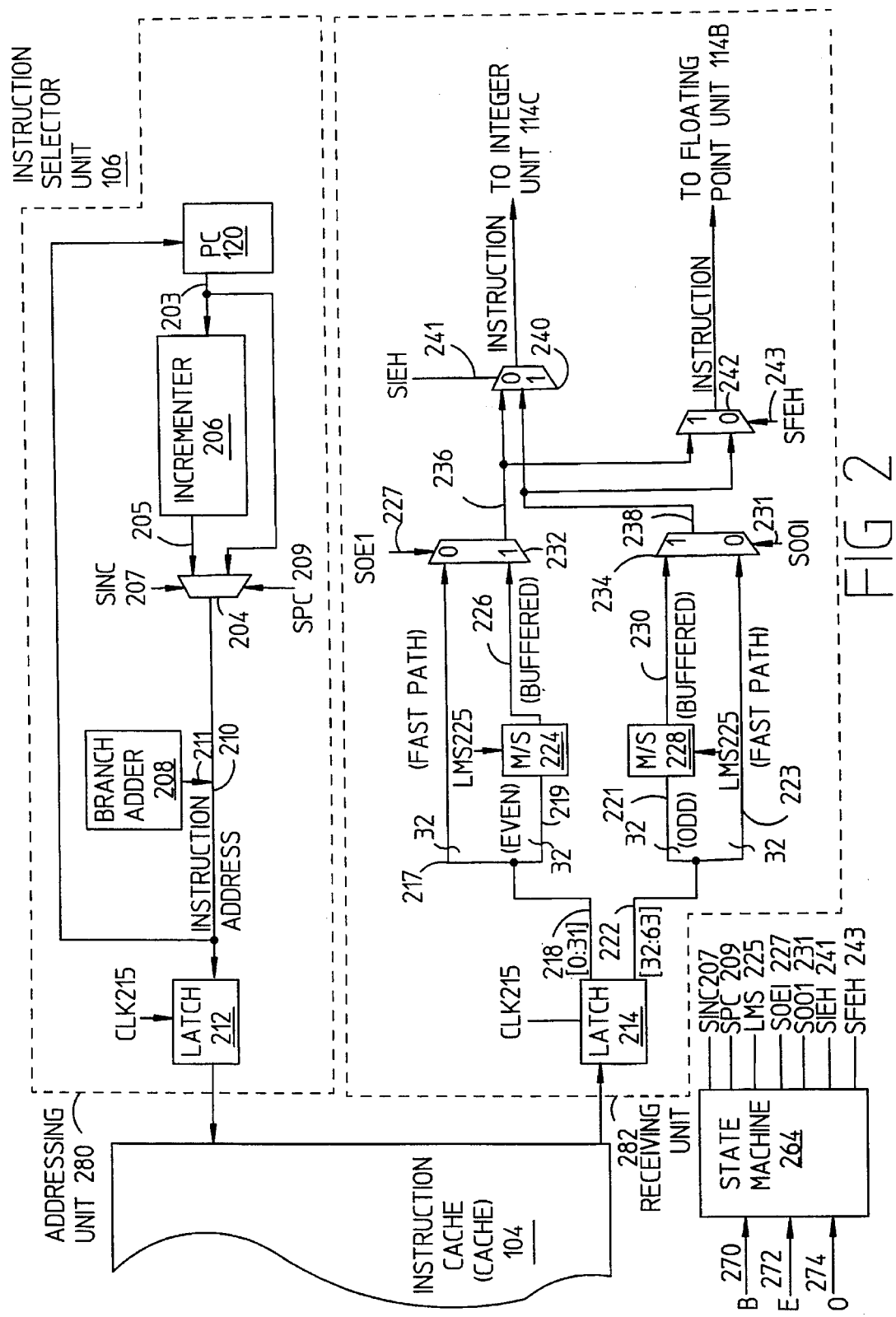
FIG. 2 illustrates a block diagram of an instruction selector unit according to the present invention.

FIG. 2 illustrates a block diagram of the instruction selector unit 106 according to the present invention. The instruction selector unit 106 has two principal functional units shown as dotted lines: an addressing unit 280 and a receiving unit 282. The addressing unit 280 includes: the PC 120, an incrementer 206, a branch adder 208, a multiplexer 204 and a latch 212. The receiving unit 282 includes: a latch 215, multiplexers 222, 228, 240, 242, and master/slave registers 224, 228. Addressing unit 280 places the contents of the PC 120 on the address bus 210. The receiving unit 282 receives and buffers the corresponding instructions received from cache 104, and before sending them to the execution unit 112. The receiving unit additionally bundles pairs of instructions for simultaneous execution.

In the preferred embodiment, all instructions are fetched from cache 104 in aligned doublelongword quantities. As apparent to those skilled in the art, instruction quantities can be any length. The incrementer 206 increments the PC 120 by 8 (corresponding to 8 bytes, or a doublelongword) when two instructions are executed simultaneously.

Normally instructions are fetched from cache 104 in sequential order. However, there are situations that may cause the PC 104 to take on a value other than its normal sequential value. For instance, the branch adder 208 coupled to PC 120 via bus 211 may change the PC 120 so as to initiate instruction fetching out of sequential order. In any case, the read address is latched by a latch 212, which is controlled by a clock signal 215.

As explained above, the receiving unit 282 is used to receive and bundle instructions for execution by the execution unit 112. Doublelongwords received from cache 104 are first stored in latch 214. Doublelongwords are then divided into an "even" instruction (bits 0:31 of the doublelongword), and an "odd" instruction (bits 32:63 of the doublelongword). The receiver unit 282 does not need to buffer more than the two instructions, which in the preferred embodiment is a total of 64 bits.

Even instructions are transferred on an even bus or path 218 having two possible routes to transport instructions: a buffered path or bus 219 coupled to a master/slave register 224 and a fast path or bus 217 coupled to a multiplexer 232. Odd instructions are transferred on an odd bus or path 222 having two possible routes to transport instructions: buffered path or bus 221 coupled to a master/slave register 228 and a fast path or bus 223 coupled to a multiplexer 234. The instruction selector unit 282 either buffers instructions in master/slave registers 224, 228 (registers) or passes instructions directly to the multiplexers 232, 234 for immediate or "fast path" execution. It should be noted that any storage device contemplated by those skilled in the art can be substituted for master/slave registers 224 and 228. Multiplexers 232, 234 select either fastpath instruction(s), or buffered instruction(s). Buffered instructions are selected via outputs 226, 230 of master/slave registers 224, 228 respectively. In the preferred embodiment multiplexers 232, 234 are 2:1 multiplexers.

Whether instructions are buffered or chosen for fastpath execution typically depends on which instructions can be bundled with one another for immediate simultaneous execution. Generally, if even and odd instructions transmitted to the receiving unit 282 from cache 104 can be bundled, then they will follow the fast path via busses 218 and 222 bypassing registers 224, 228, for immediate execution. On the other hand, if even and odd instructions received from cache 104 cannot be bundled, then either the even or odd instruction will be selected from latch 214 for fast path execution (depending on the state of a state machine 264), and the non-selected instruction will be loaded into one of the master/slave registers 224 or 228 for use in a subsequent processor cycle. Instructions that are stored in registers 224 or 228 may be bundled with other instructions in subsequent processor cycles. Specific explanation of how instructions are treated by the receiver unit 282 is described below with reference to the state machine 264.

Multiplexers 240 and 242 provide a means for directing even and odd instructions to the floating-point unit 114B and the integer unit 114C or any operation unit located in the instruction execution unit 112. In the preferred embodiment, multiplexers 240 and 242 select which outputs 236 and 238 of multiplexers 232 and 234 are to be sent to the floating-point unit 114B and the integer unit 114C.

Addressing unit 280 and receiving unit 282 are controlled by the state machine 264. In particular, the state machine 264 controls master/slave registers 224, 228, and multiplexers 204, 232, 234, 241,242. State machine 264 includes a plurality of input and output signals. The signals and their abbreviated terms are listed in Table 1 below.

TABLE 1

| INPUT SIGNALS | ABBREVIATED TERM |
| --- | --- |
| Bundle Signal | B 117 |
| Even Branch Signal | E 272 |
| Odd Branch Signal | O 274 |
| OUTPUT SIGNALS | ABBREVIATED TERM |
| Select Incrementer | SINC 207 |
| Select PC | SPC 209 |
| Load Master/Slave | LMS 225 |
| Select Old Even Instruction | SOEI 227 |
| Select Old Odd Instruction | SOOI 231 |
| Select Integer Even High | SIEH 241 |
| Select Floating-point Even High | SFEH 243 |

Bundle signal 117 comes from the instruction decode unit 116, and indicates whether two instructions read from cache can be bundled. Even branch signal 272 and odd branch signal 274 are received from the instruction execution unit 112 which is also monitored by the branch adder 208. Even branch signal 272 indicates whether a branch to an even address is taken. Odd branch signal 274 indicates whether a branch to an odd address is taken. All three input signals 117, 272, 274 are active-high.

In the preferred embodiment, state machine 264 has four states. The next state of the state machine 264 depends solely on the current state and signals B 117, E 272, and O 274.

The state machine 264 consists of combinational and sequential logic components. It should be noted that the reduction of a state diagram to a logic circuit is generally a routine task for those skilled in the art. The task is generally analogous to the coding of computer program from a flow chart.

Figure 3:
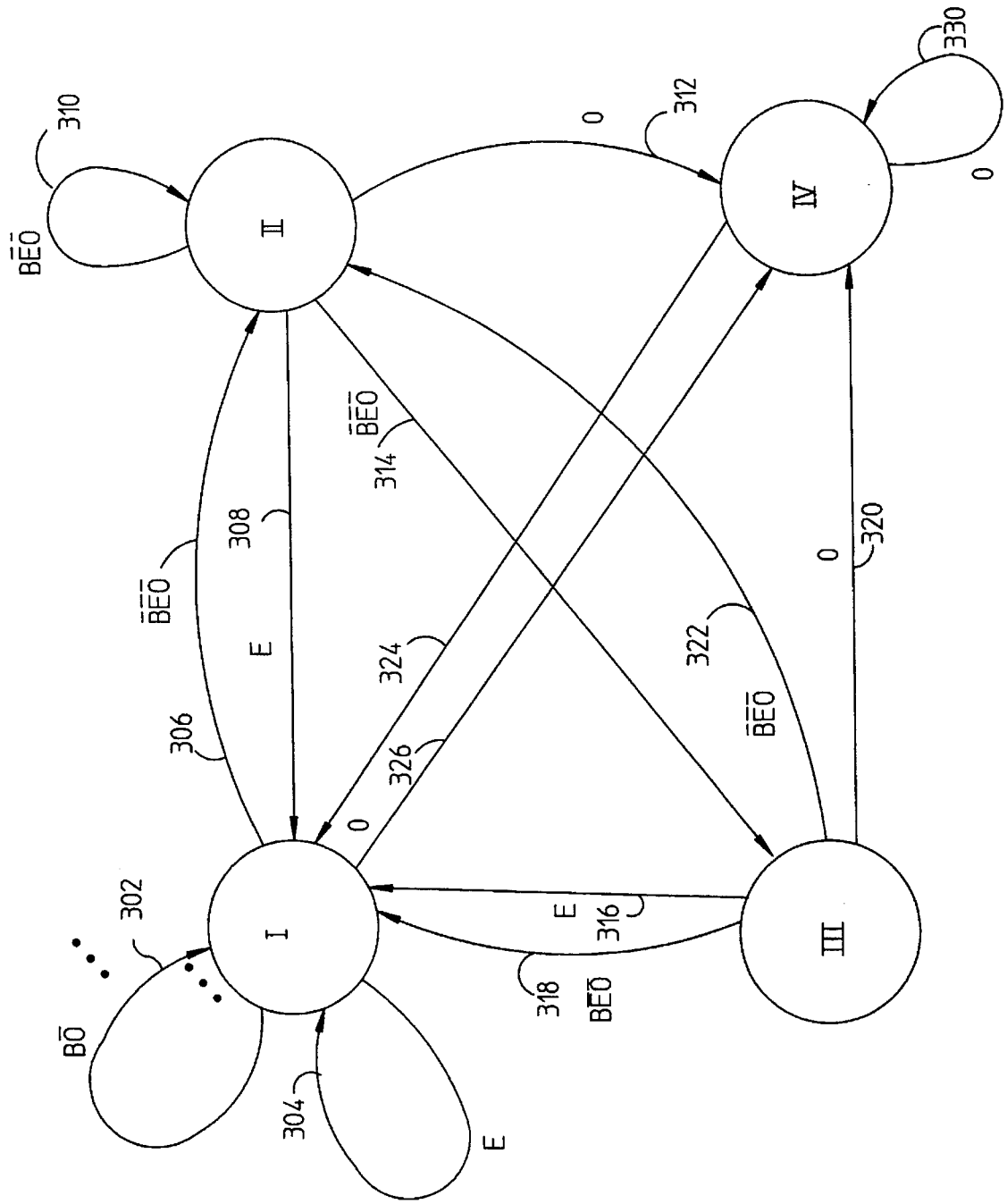
FIG. 3 illustrates the operational state of the state machine as a means for controlling the instruction selector unit.

The operation of state machine 264 is described in a state machine diagram shown in FIG. 3. FIG. 3 illustrates the operational state of the state machine 264 as a means for controlling the instruction selector unit 106. All transitions between states, represented by arrows, occur on different scenarios depending on the input signals 117, 272, 274, and the current state. Table 2 is a state transition table, showing all possible transitions between states. The information shown in Table 2 is redundant of information contained in the state machine diagram of FIG. 3. Entries of "X" indicate a that the level of the corresponding signal is not relevant to determination of the next state. The operation of the state machine 264 is best understood by referring to Table 2, and the corresponding hardware diagram of FIG. 2.

TABLE 2

STATE TRANSITION TABLE FOR STATE MACHINE 264

| Current State | Bundle 117 | Even Branch 272 | Odd Branch 274 | Next State |
|---|---|---|---|---|
| I | 1 | X | 0 | I |
| I | X | 1 | 0 | I |
| I | 0 | 0 | 0 | II |
| I | X | 0 | 1 | IV |
| II | 1 | 0 | 0 | II |
| II | X | 1 | 0 | I |
| II | 0 | 0 | 0 | III |
| II | X | 0 | 1 | IV |
| III | 0 | 0 | 0 | II |
| III | X | 0 | 1 | IV |
| III | X | 1 | 0 | I |
| III | 1 | X | 0 | I |
| IV | X | X | 0 | I |
| IV | 0 | X | 0 | I |
| IV | 0 | 0 | 1 | IV |

States I and III represent aligned doubleword operations. State II represents misaligned operations and state IV is a transition state that is used after receiving an odd branch target address. Even branch target addresses via signal 272 will cause a transition to state I and an odd branch target address via signal 274 will cause a transition to state IV.

As those skilled in the art are aware, the criteria for bundling two instructions depends on the particular data path and control constraints of the processor. In the preferred embodiment, the following pairs of instructions can be bundled as described as follows: integer instruction operations (which includes load and store operations) (first) with floating-point instructions (second) or visa versa; or floating-point instructions (first) with branch instructions (second). Generally, no instruction can be bundled immediately following a branch instruction. And no instruction can be bundled with the target of a branch if the address of this target is not doubleword aligned.

The present invention can be used for bundling two pairs of integer instructions with one another; or two pairs of floating-point instructions with one another. However, in the preferred embodiment there is only one integer trait 114C and one floating-point unit 114B. Consequently, this prevents the execution of integer/integer or floating-point/ floating-point bundles.

The operation of the instruction selector unit 106 will now be described with reference to FIGS. 2, 4–7. FIGS. 4–7 are flowcharts illustrating the operation of the instruction selector unit 202 for all four possible states of operation. Although the flowcharts give the impression that the state machine performs the operations in a particular order, it should be understood that some of operations outlined by the flowcharts are performed simultaneously in practice.

STATE I

Figure 4:
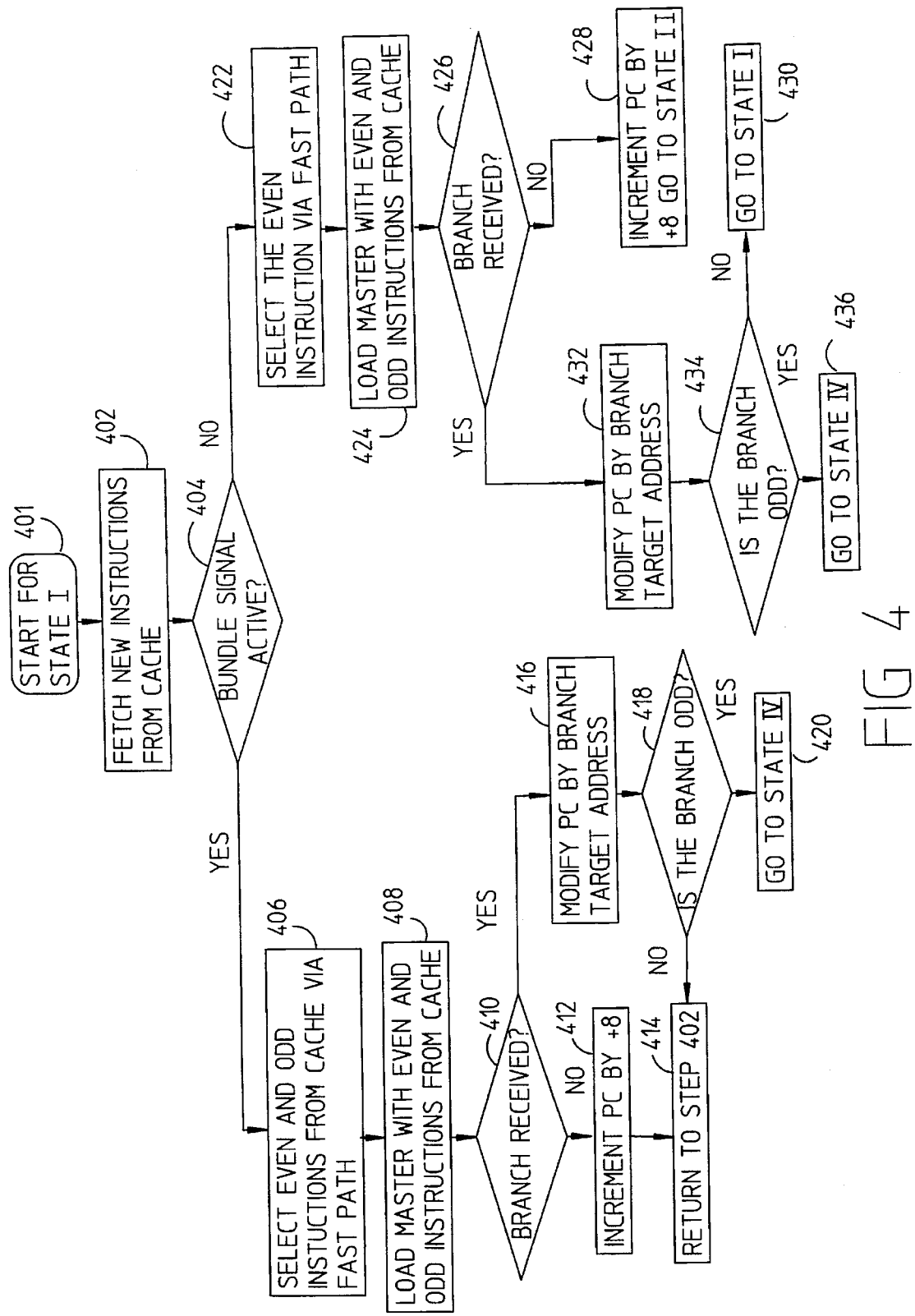
FIG. 4 is a flowchart illustrating the operation of instruction selector unit while operating in state I.

FIG. 4 is a flowchart that illustrates state 1 of the instruction selector unit 106. In steady state operation (when active or high bundle signals are received and no branches are taken) instruction selector unit 106 functions in an aligned doubleword instruction mode. When two instructions read from cache can be bundled they are selected for fast path execution on busses 218 and 222. When instructions cannot be bundled in state I, the odd instruction is stored in register 228 for use in a subsequent state and the even instruction is selected for immediate execution. The latter operation represents a single instruction operation. The description of state I will now be explained in more detail with reference to steps 401–436 of FIG. 4.

Referring to FIG. 4, in step 402 new instructions are fetched from cache 104 and stored in latch 214.

In a decisional step 404, it is determined whether the two instructions stored in latch 214 can be bundled. A low level on bundle signal 117 indicates that the two instructions in latch 214 cannot by bundled. The "NO" path of decisional step 404 is taken in this situation. A high level on bundle signal 117 indicates that the two instructions in latch 214 can be bundled. The "YES" path of decisional step 404 is taken in this situation. The "YES" path includes steps 406–420 and the "NO" path includes steps 422–436.

A. Bundle Signal received (YES PATH)

The "YES" path of FIG. 4 will now be discussed in detail. As explained above steps 406–420 are performed when pairs of instructions can be bundled. In step 406, new even and new odd instructions are selected for fast path execution. The fastpath inputs 318 and 322 to multiplexers 232 and 234 are selected by driving signals 227 and 231 low. Outputs 236 and 238 are sent to one of the operational units 114B or 114C for execution. Selection is controlled by mulitplexers 240 and 242. For instance, an even instruction via output 236 can be sent to the integer unit 114C if signal 241 is a logic high level. An odd instruction via output 238 can be sent to integer unit 114C if signal 241 is logic low.

In step 408, registers 224 and 228 are loaded with the even and odd instructions fetched from cache 104 in step 402. This occurs regardless of whether the two instructions were bundled in step 408. It is not necessary to store the even and odd instructions in step 408, since they were already sent for execution. However, in the preferred embodiment, for consistency purposes with states II–IV, they are loaded into registers 224 and 228.

Steps 410–420 detail the operation of the instruction selector unit 106 for sequential as well as non-sequential operation. In decisional step 410, the state machine 264 checks the level of the even branch signal 272 and the odd branch signal 274. If both signals are low, indicating that no branch was taken, the "NO" path of decisional step 410 is followed. Accordingly, in step 412 the incrementer 206 increases the PC 120 by 8. The state machine 264 sends an actuation signal 207 to select the incrementer 206. The corresponding instruction address 210 will be sent to cache 104 for fetching in subsequent processor cycles. Finally, in step 414, the state machine 264 returns to step 402.

If a high level is received on either of branch signals 272, 274 in step 410, then the "YES" branch of step 410 is followed. Accordingly, branch adder 208 via bus 211 modifies the PC 120 to point to the address of the taken branch. The state machine 264, sends an actuation signal 209 to multiplexer 204 so that the PC output 203 is selected as the instruction address 210 for cache 104. If the target address of taken branch is even, then the "NO" path of decisional step 418 is followed, which returns the state machine 264 back to state I in step 414. If the target address of the taken branch is odd, then the "YES" path of decisional step 418 is followed. Accordingly, in step 420 a transformation from state I to state IV occurs, since an odd branch target address was received in step 418.

B. No bundle signal received (NO PATH)

Steps 422–436 describe the operation of the instruction selector unit 106 when a low bundle signal 117 is received in step 404, indicating that the odd and even instructions cannot be bundled. In this situation, the instruction selector unit 106 selects the even instruction for execution during the current state, and stores the odd instruction for use in a subsequent state.

Accordingly, in step 422 only the even instruction from latch 214 is selected for execution. This occurs by transmitting a logic low level on signal 231, which selects the fast path 218 as an output 238 of multiplexer 234 for execution.

In step 424, both the even and odd instructions are latched into registers 224 and 228. The state machine 264 sends an actuation signal 225 to registers 224 and 228 which causes the contents of busses 218 and 222 to be loaded into registers 224 and 228. The odd instruction must be loaded into in register 228 since it has not yet been executed by the execution unit 112.

Steps 426–436 are similar to steps 410–420 described above. The significant difference occurs in step 428. Step 428 is redundant to transformation arrow 306 of FIG. 3, and indicates that the instruction selector unit 106 will transition from state I to state II if bundle signal 117 and branch signals 272, 274 are low.

STATE II

Figure 5:
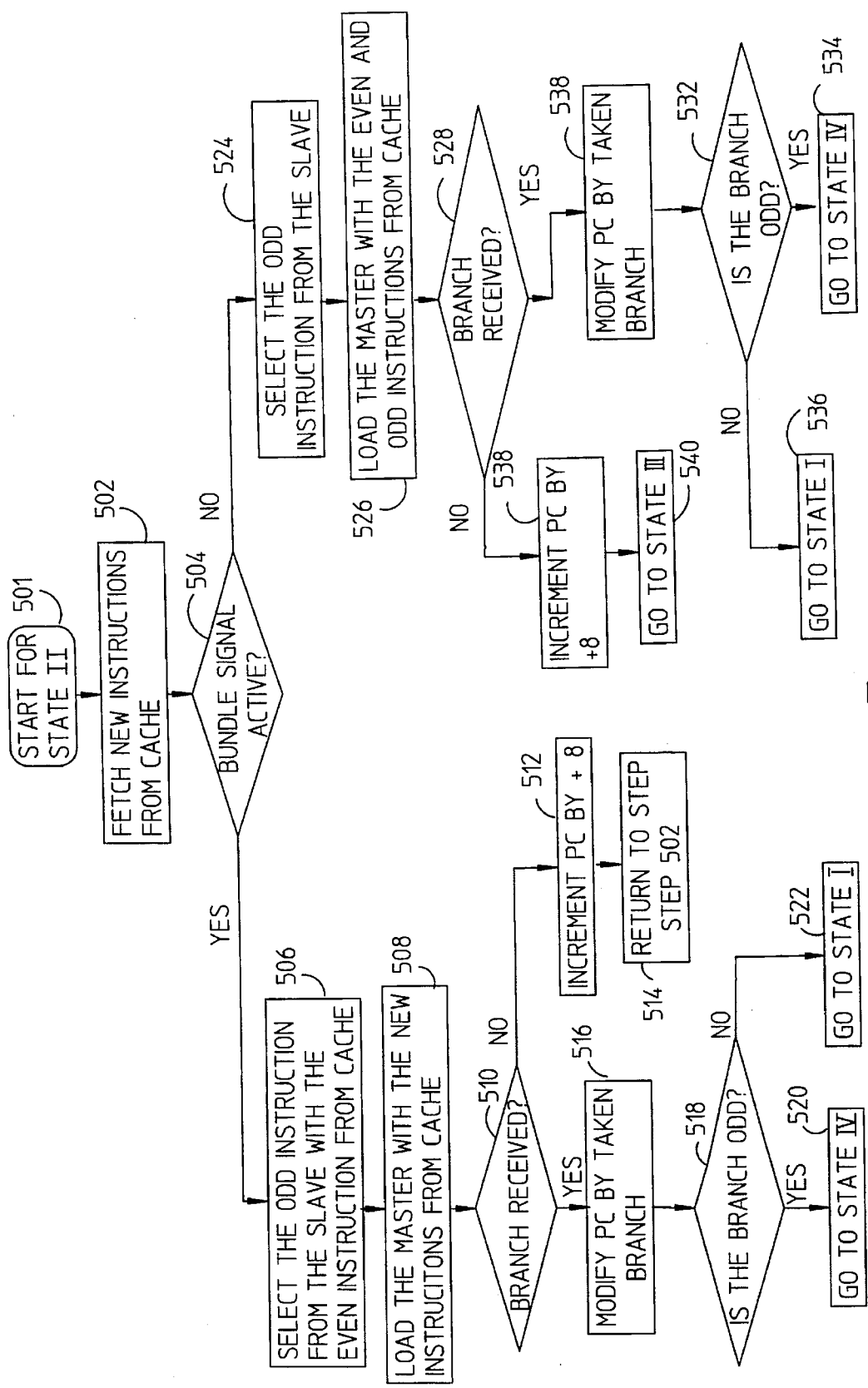
FIG. 5 is a flow chart illustrating the operation of instruction selector unit while operating in state II.

FIG. 5 is a flow chart illustrating the operation of the instruction selector unit 106 while operating in state II. In steady state operation (when all pairs of instructions can be bundled and no branches are taken) instruction selector unit 106 functions in a misaligned doubleword mode. When a new even instruction from cache 104 can be bundled with an old odd instruction stored in register 228 from a previous state, the new even instruction is selected for simultaneous execution with the old odd instruction. When a new even instruction from cache 104 cannot be bundled with the old odd instruction stored in register 228, the old odd instruction is selected for execution. The new even and odd instructions from cache 104 are loaded into registers 226 and 228 for use in a subsequent processor cycle. The description of state II will now be explained in more detail with reference to steps 501–540 of FIG. 5.

In a step 502, new even and odd instructions are fetched from cache 104 and latched into latch 214.

In a decisional step 504, if a high bundle signal 117 is received by the state machine 264 the "YES" path will be chosen. If a low bundle signal 117 is received by the state machine 264 the "NO" path will be chosen. A high bundle signal 117 (the "YES" path) indicates that a new even instruction from cache can be bundled with a misaligned old odd instruction stored in register 228. The "YES" path includes steps 506–522 and the "NO" path includes steps 524–540.

A. High Bundle Signal Received (YES PATH)

The "YES" path of FIG. 5 will now be discussed in detail. In step 506, the old odd instruction from register 228 is executed with the new even instruction from cache 104. The old odd instruction is selected by a high select signal 234 from the state machine 264. The new even instruction is selected by a low signal 227 from the state machine 264. Outputs 236 and 238 of multiplexers 232 and 234 can then be sent to either the floating point unit 114B or the integer unit 114C for execution.

In step 508, registers 224 and 228 are loaded with the new even and the new odd instruction fetched from cache 104 in step 502.

Steps 510–522 detail the operations of the instruction selector unit 106 for sequential as well as non-sequential program flow. In decisional step 510, the state machine 264 indicates whether or not a high branch signal, even branch signal 272 or odd branch signal 274, from the execution unit 112 is received. If a high branch signal is not received, the "NO" path of decisional step 510 is followed. Accordingly, in step 512 the incrementer 206 increases the PC 120 by 8. Finally, in step 514, the state machine 264 returns to step 502. This type of operation represents steady-state misaligned bundled execution.

If a high branch signal is received in step 510, then the "YES" branch of step 510 is followed. Accordingly, the branch adder 208 modifies the PC 120 via bus 211, to point to the address of a taken branch. The state machine 264, sends an actuation signal 209 to multiplexer 204 so that the PC output 203 is selected as the instruction address 210 for cache 104. If the taken branch is even, then the "NO" path of decisional step 518 is followed, which sends the state machine 264 to state I as shown in step 522. If the taken branch is odd, then the "YES" path of decisional step 518 is followed and the state machine 264 changes from state I to state IV, as shown in step 520.

B. Low Bundle Signal Received (NO PATH)

Steps 522–536 describe the operations of the instruction selector unit 106 when the bundle signal 117 in step 504 is low. As a result of not being able to bundle new even instructions with old odd instructions, it is desirable to execute the oldest instruction first on a first-in-first-out basis.

Accordingly, in step 522 the old odd instruction from register 228 is selected for execution. The state machine 264 transmits a logic high signal 231 to multiplexer 234, which selects the output 230 of register 228 as the output 238 of multiplexer 234.

In step 524, both the even and odd instructions are latched into registers 224 and 228. The state machine 264 sends an actuation signal 225 to registers 224 and 228 which causes the contents on busses 218 and 222 to be stored in registers 224 and 228.

Steps 528–540 are similar to steps 510–520 described above. The only difference occurs in step 540. Step 540 is redundant to transformation arrow 306 of FIG. 3. Both step 428 and transformation arrow 314 indicate that the instruction selector unit 106 will transition from state II to state III when bundle signal 117 and branch signal 272, 274 are low.

STATE III

Figure 6:
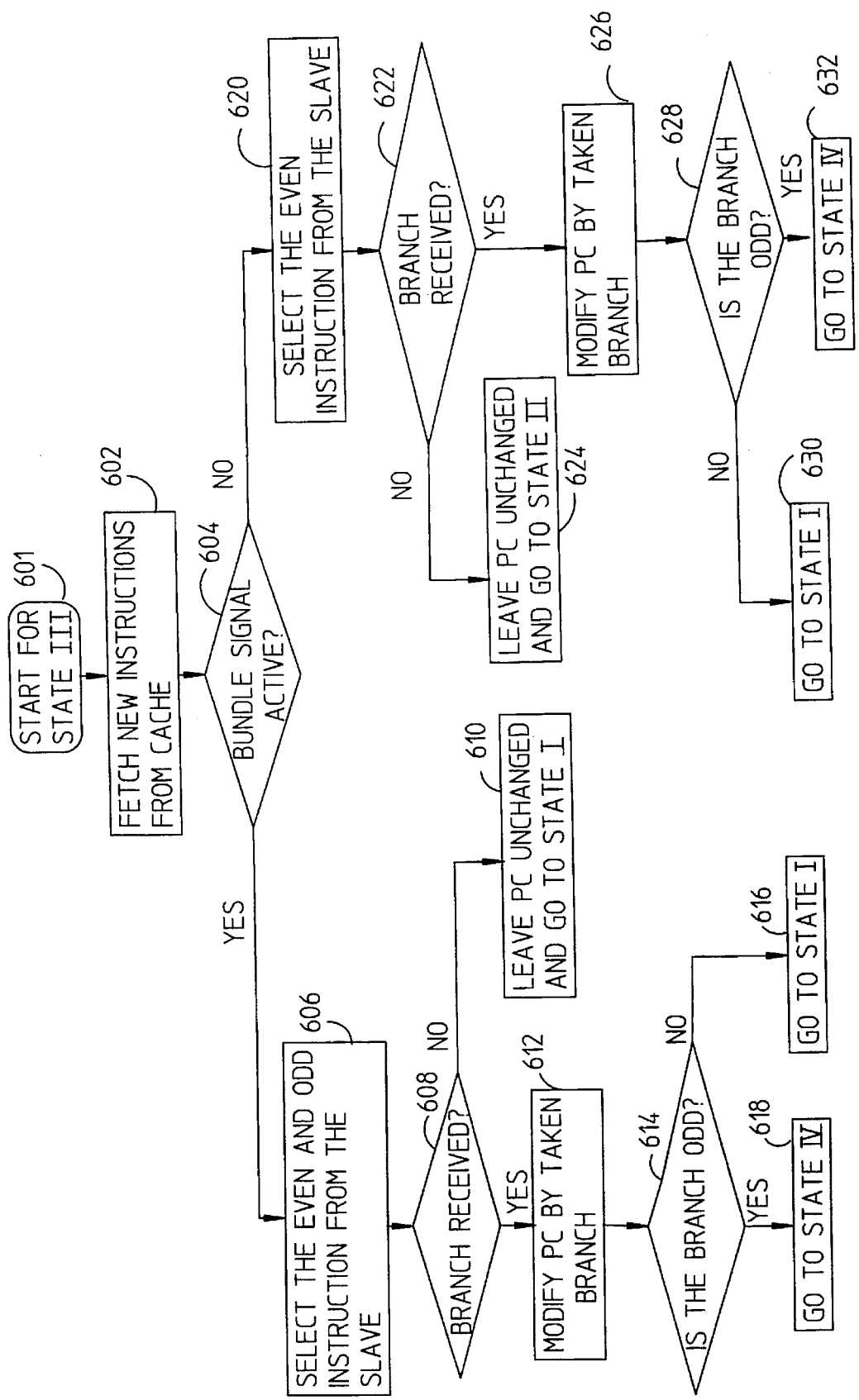
FIG. 6 is a flow chart illustrating the operation of instruction selector unit while operating in state III.

FIG. 6 is a flow chart illustrating the operation of the instruction selector unit 106 while operating in state III. In steady state operation (when all pairs of instructions can be bundled and no branches are taken) instruction selector unit 106 functions in an aligned doubleword mode. When an old even instruction from register 224 can be bundled with an old odd instruction from register 228, both of the old even and the old odd instructions are selected for simultaneous execution by the execution unit 112. When an old even instruction cannot be bundled with an old odd instruction, the old even instruction is selected for immediate execution by the execution unit 112 during the present state. The PC is left unchanged so that new odd instruction and new even instruction fetched from cache 104 can be recalled in a subsequent state, otherwise they will be lost if the PC is incremented. A description of state III will now be explained in more detail with reference to steps 601–632 of FIG. 6.

In step 602, new even and odd instructions are fetched from cache 104 and latched into latch 214.

In a decisional step 604, if a high bundle signal 117 is received by the state machine 264 the "YES" path will be chosen and if a low bundle signal 117 is received by the state machine 264 the "NO" path will be chosen. A high bundle signal 117 (the "YES" path) indicates that an old even instruction in register 224 can be bundled with an old odd instruction stored in register 228. The "YES" path includes steps 604–618 and the "NO" path includes steps 620–632.

A. High Bundle Signal Received (YES PATH)

The "YES" path of FIG. 6 will now be discussed in detail. In step 606, the old even instruction from register 224 is executed simultaneously with the old odd instruction from register 228. The old even instruction is selected by a high signal 227 transmitted from the state machine 264. The old odd instruction is selected by a high select signal 234 transmitted from the state machine 264. Outputs 236 and 238 of multiplexers 232 and 234 can then be sent to either operational unit 114B or 114C for execution.

Steps 608–618 detail the operation of the instruction selector unit 106 during sequential as well as non-sequential operation. In decisional step 610, the state machine 264 indicates whether or not a high branch signal, even branch signal 272 or odd branch signal 274, from the execution unit 112 is received. If a high branch signal is not received, than the "NO" path of decisional step 510 is followed. Accordingly, in step 610 the PC 120 is left unchanged. A select PC signal 209 is sent by the state machine 264, which enables the instruction address 210 to take on the old value of the PC 120.

If a high branch signal 272 or 274 is received in step 610, then the "YES" branch of step 610 is followed. Accordingly, the branch adder 208 modifies the PC 120 via bus 211, to point to the address of a taken branch. The state machine 264, sends an actuation signal 209 to multiplexer 204 so that the PC output 203 is selected as the instruction address 210 for cache 104. If the taken branch is even, then be "NO" path of decisional step 614 is followed, which sends the state of the instruction unit 106 to state I as shown in step 616. If the taken branch is odd, then the "YES" path of decisional step 614 is followed and the state machine 264 changes from state III to state IV, as shown in step 618.

B. Low Bundle Signal Received (NO PATH)

Steps 620–632 describe the operations of the instruction selector unit 106 when bundle signal 117 in step 604 is low. As a result of not being able to bundle old even instructions with old odd instructions, it is desirable to execute the old even instruction first, since a previous old odd instruction was executed last in state II.

Accordingly, in step 620 the old even instruction from register 224 is selected for execution. The state machine 264 transmits a logic high signal 227 to multiplexer 232, which selects the output 226 of register 224 as the output 236 of multiplexer 232.

Steps 622–632 are similar to steps 608–618 described above. The only difference occurs in step 624. Step 624 is redundant to transformation arrow 322 of FIG. 3. Both step 624 and transformation arrow 322 indicate that the instruction selector unit 106 will transition from state III to state II when bundle signal 117 and branch signals 272, 274 are low.

STATE IV

FIG. 7 is a flow chart illustrating the operation of instruction selector unit 106 while operating in state IV. A transition to state IV results whenever an odd branch target address is taken. The instruction selector unit 106 sends the new odd instruction from cache 104 for immediate execution. The PC 120 is then incremented by 4 to get the count of the PC 120 to start on even an instruction. This is desirable, since instruction selector unit 106 transitions to state I after state IV. A description of state IV will now be explained in more detail with reference to steps 701–714 of FIG. 7.

In step 702, new even and odd instructions are fetched from cache 104 and latched into latch 214.

In step 704, the new odd instruction is selected for execution. A logic low signal 231 from the state machine diagram 264 is sent to multiplexer 234, which selects the fast path 222 as the output 238 of multiplexer 234.

In step 706, the state machine 264 indicates whether a high branch signal 272, 274 is received. If there is a even branch signal 272, or odd branch signal 274, then the "YES" path of step 706 is followed. In step 712, PC 120 is modified by the branch adder 208 so that the PC 120 points to the target address of the taken branch. If the taken branch is even, the instructor selector unit 106 transitions to state I as indicated in step 714 of FIG. 7. If the taken branch is odd, the instructor selector unit 106 remains in state IV and the instructor selector unit returns to step 702. In the preferred embodiment two consecutive odd branch instructions will not occur. Accordingly, the instructor selector unit 106 will automatically return to state I on the next cycle of operation.

If no branches are taken in step 706, then in step 708 the PC 120 is incremented by 4 and the instruction selector unit transitions to state I in step 710.

While various embodiments of the present invention have been described above, it should be understood that they have been presented by way of example only, and are not intended to be limiting. Thus, the breadth and scope of the present invention should not be limited by any of the above-described exemplary embodiments, but should be defined only in accordance with the following claims and their equivalents.

What is claimed is:

1. Apparatus for selecting and buffering multiple instructions fetched from a memory system for simultaneous execution by a processor, comprising:

addressing means for fetching even and odd instructions from the memory system;

a decoder unit configured to generate a bundle signal indicating whether a pair of even and odd instructions can be executed simultaneously;

first and second busses, electrically coupled to the memory system, operable to transport said even instructions received from the memory system;

third and fourth busses, electrically coupled to the memory system, operable to transport said odd instructions received from the memory system;

a first master/slave register, electrically coupled to said second bus, operable to store said even instructions;

a second master/slave register, electrically coupled to said third bus, operable to store said odd instructions;

first selector means, responsive to said bundle signal, having input terminals and output terminals, said input terminals electrically coupled to said first and fourth busses and said first and second master/slave registers, for selecting, at one of said output terminals, an even instruction from either said first bus or said first master/ slave register, and for selecting, at another one of said output terminals, an odd instruction from either said fourth bus or said second register;

second selector means, having input terminals electrically coupled to said output terminals of said first selector means, said second selector means having output terminals coupled to the execution unit, for routing aligned even and odd instructions that can be bundled, misaligned even and odd instructions that can be bundled or individual even or odd instruction that cannot be bundled from said first selector means to specific operational units located in the execution unit; and control logic means, coupled to said first and second selector means, for generating signals that control which input terminals are selected by said first and second selector means.

2. The apparatus of claim 1, wherein said first selector means is comprised of a first and second multiplexer, said first multiplexer is electrically coupled to said first bus and said first master/slave register, operable to select an even instruction from said first bus or said first master/slave register, as an output of said first multiplexer; and said second multiplexer is electrically coupled to said fourth bus and said second master/slave register, operable to select an odd instruction from either said fourth bus or said second master/slave register, as an output of said second multiplexer.

3. The apparatus of claim 1, wherein said second selection means is comprised of a third and fourth multiplexer, said third multiplexer coupled to said outputs of said first and second multiplexers, operable to select one of said outputs of said first and second multiplexers as an output of said third multiplexer for execution by an integer unit located in the execution unit; and said fourth multiplexer coupled to said outputs of said first and second multiplexers, operable to select one of said outputs of said first and second multiplexers as an output of said fourth multiplexer for execution by a floating-point unit located in the execution unit.

4. A system for selecting and buffering pairs of instructions from a memory system for simultaneous execution by an execution unit of a central processing unit, comprising:

addressing means, coupled to the memory system, for fetching instructions from said memory system;

receiving means, coupled to the memory system, for receiving said instructions from said memory system and for sending a pair of even and odd instructions for immediate execution if said pair of even and odd instructions can be bundled, and for buffering one of said pair of even and odd instructions if said pair of even and odd instructions cannot be bundled, wherein said receiving means is configured to bundle said buffered even instruction with a new odd instruction received by said receiving means from the memory system or said buffered odd instruction with a new even instruction received by said receiving means from the memory unit in misaligned format for simultaneous execution by the execution unit;

decoding means, coupled to the memory, system, for generating a bundle signal indicating whether a pair of even and odd instructions received from the memory unit can be executed simultaneously, whether said buffered even instruction can be executed simultaneously with said new odd instruction or whether said buffered odd instruction can be executed simultaneously with said new even instruction; and control logic means, coupled to said receiving means and responsive to said bundle signal, for instructing said receiving means:
(a) when to send a pair of said even and odd instructions for immediate execution,
(b) when to buffer one of said even instructions or one of said odd instructions,
(c) when to bundle an even instruction with an odd instruction in said misaligned format for simultaneous execution by the execution unit.

5. The system of claim 4, wherein said receiving means is comprised of:

an even register coupled to the memory system having an input terminal and output terminal, operable to store even instructions received from the memory system;

an odd register, having an input terminal and output terminal, operable to store odd instructions received from the memory system, said odd register coupled to the memory system;

an even multiplexer, having two input terminals and an output terminal, operable to select said stored even instructions from said even register or an even instruction received directly from the memory system at said output terminal of said even multiplexer, said even multiplexer coupled to the memory system and said even register; and an odd multiplexer, coupled to the memory system and said odd register having two input terminals and an output terminal, operable to select at said output terminal of said odd multiplexer said stored odd instructions from said odd register or an odd instruction received directly from the memory system.

6. The system of claim 5, wherein said receiver means further comprises:

a floating-point multiplexer, having a set of input terminals and an output terminal, said floating-point multiplexer coupled to said even and odd multiplexers, operable to select at said output terminal of said floating-point multiplexer one of said even or odd instructions from said even or odd multiplexers, for execution in a floating point unit.

7. The system of claim 5, wherein said receiver means further comprises:

a integer multiplexer, having a set of input terminals and an output terminal, said integer multiplexer coupled to said even and odd multiplexers, operable to select at said output terminal of said integer multiplexer one of said even or odd instructions from said even or odd multiplexers for execution in an integer unit.

8. The system of claim 4, wherein said addressing means includes:

(a) a program counter for indicating a program sequence value;

(b) an incrementer, coupled to said program counter, operable to increase said program sequence value of said program counter by a quantity n;

(c) a branch adder, coupled to said program counter, operable to change said program sequence value by a value x;

(d) a multiplexer, having a first input coupled to said program counter and a second input coupled to said incrementer, for selecting said program sequence value or said program counter increased by said incrementer, as an output of said multiplexer; and (e) an address bus, for transferring said output of said multiplexer to the memory system.

9. The system of claim 4, wherein said control means is further responsive to an even branch signal and an odd branch signal.

10. In an instruction selection means, having an addressing means for fetching even and odd instructions from a memory system, said addressing means having a program counter, said instruction selection means also having a receiver means for storing and sending even and odd instructions for execution, said receiver means having an even buffered pathway for storing even instructions in an even register and an odd buffered pathway for storing odd instructions in an odd register, said receiver means also having a non-buffered even fast path, for transferring said even instructions to an execution unit of a computer, and a non-buffered odd fast path, for transferring said odd instructions to said execution unit, said instruction selector means configured to receive a bundle signal from an instruction decode unit which indicates whether an even instruction can be executed simultaneously with an odd instruction, and configured to receive branch signals indicating whether an even or an odd branch is taken, a method comprising the steps of:

(a) fetching an even and odd instruction from the memory system;

(b) detecting whether the bundle signal is received from the instruction decode unit;

(c) if the bundle signal is received in step (b), then transferring said even and odd instructions to the execution unit via the even and odd fast path for immediate execution; and (d) if the bundle signal is not received in step (b), then loading the odd register with said odd instruction and transferring said even instructions to the execution unit via the fast path, wherein said loaded odd instruction can either be bundled with another even instruction or executed independently of other instructions during a subsequent processor.

11. The method of claim 10, further comprising the steps of:

(e) fetching a pair of even and odd instructions from the memory system;

(f) detecting whether the bundle signal is received from the instruction decode unit;

(g) if the bundle signal is received in step (f), then transferring said odd instruction from said odd register received in step (d) to the execution unit via the odd buffered path for execution and transferring said even instruction received in step (e) via the fast path for execution;

(h) if the bundle signal is not received in step (f), then transferring the odd instruction received in step (d) from the odd register to the execution unit via the odd buffered path; and (i) loading the even and odd register from the memory system with said even and odd instructions fetched in step (e) for use in a subsequent processor cycle.

12. The method of claim 11, further comprising the steps of:

(j) fetching even and odd instructions from the memory system;

(k) detecting whether the bundle signal is received from the instruction decode unit;

(l) if the bundle signal is received in step (k), then transferring the even and odd instruction, received in step(i), from the even and odd register to the execution unit via the even and odd buffered pathway; and (m) if the bundle signal is not received in step (l), then transferring the even instruction received in step (i) from the even register to the execution unit via the even buffered pathway.

13. The method of claim 12, further comprising the steps of:

(BB) detecting whether a branch signal is received; and (CC) if a branch signal is not detected in step (BB) and a bundle signal is detected in step (k), then performing steps (a)–(d).

14. The method of claim 11, further comprising the steps of:

(j) fetching even and odd instructions from the memory system;

(k) detecting whether the bundle signal is received from the instruction decode unit;

(l) if the bundle signal is received in step (k), then transferring the even and odd instruction received in step (i) from the even and odd register to the execution unit via the even and odd buffered pathway; and (m) if the bundle signal is not received in step (l), then transferring the even instruction received in step (i) from the even register to the execution unit via the even buffered pathway.

15. The method of claim 14, further comprising the steps of:

(n) fetching even and odd instructions from the memory system; and (o) transferring the odd instruction received in step(n) to the execution unit via the odd fast path.

16. The method of claim 10, further comprising the steps of:

(n) fetching even and odd instructions from the memory system; and (o) transferring the odd instruction to the execution unit via the odd fast path.

17. The method of claim 16, further comprising the steps of:

(DD) detecting whether a branch signal is received;

(EE) if no branch signal is detected in step (BB), then incrementing the program counter and performing steps (a)–(d).

18. The method of claim 15, further comprising the steps of:

(p) detecting whether a branch signal is received;

(q) if a branch signal is detected, then modifying the program counter by the taken branch;

(r) if the branch signal is odd in step (c), then performing steps (n)–(o);

(s) if the branch signal is even in step (q), then performing steps (a)–(d); and (t) if a branch signal is not detected and a bundle signal is detected in step (b), then incrementing the program counter and performing steps (a)–(d); and (u) if a branch signal is not detected and a bundle signal is not detected in step (b), then performing steps (e)–(i).

19. The method of claim 15, further comprising the steps of:

(v) detecting whether a branch signal is received;

(w) if a branch signal is detected, then modifying the program counter by the taken branch;

(x) if the branch signal is odd in step (v), then performing steps (n)–(o);

(y) if the branch signal is even in step (v), then performing steps (a)–(d);

(z) if a branch signal is not detected in step (v) and a bundle signal was detected in step (f), then performing steps (e)–(i); and (AA) if a branch signal is not detected in step (v) and a bundle signal is not detected in step (f), then performing steps (j)–(m).

* * * * *